(12) United States Patent
Hall et al.

(10) Patent No.: US 9,708,960 B2
(45) Date of Patent: Jul. 18, 2017

(54) EXHAUST AFTERTREATMENT SYSTEM DIAGNOSTIC AND CONDITIONING

(71) Applicant: Cummins IP, Inc., Columbus, IN (US)

(72) Inventors: Tony J. Hall, Bemus Point, NY (US); Stephen J. Charlton, Rancho Sante Fe, CA (US); Michael J. McGuire, Columbus, IN (US)

(73) Assignee: Cummins IP, Inc., Columbus, IN (US)

( * ) Notice: Subject to any disclaimer, the term of this patent is extended or adjusted under 35 U.S.C. 154(b) by 250 days.

(21) Appl. No.: 14/270,907

(22) Filed: May 6, 2014

(65) Prior Publication Data

US 2014/0331752 A1    Nov. 13, 2014

Related U.S. Application Data

(60) Provisional application No. 61/821,143, filed on May 8, 2013.

(51) Int. Cl.

| | |
|---|---|
| *G01M 15/10* | (2006.01) |
| *F01N 11/00* | (2006.01) |
| *F02D 41/02* | (2006.01) |
| *F02D 41/14* | (2006.01) |
| *F02D 41/22* | (2006.01) |

(Continued)

(52) U.S. Cl.
CPC ............ *F01N 11/002* (2013.01); *F01N 11/00* (2013.01); *F02D 41/029* (2013.01); *F02D 41/0235* (2013.01); *F02D 41/146* (2013.01); *F02D 41/1441* (2013.01); *F02D 41/1446* (2013.01); *F02D 41/22* (2013.01); *F02D 41/222* (2013.01); *G01M 15/102* (2013.01); *F01N 2550/00* (2013.01); *F01N 2900/0414* (2013.01); *F01N 2900/1402* (2013.01); *F01N 2900/1406* (2013.01); *F02D 41/024* (2013.01); *F02D 41/042* (2013.01); *F02D 41/2432* (2013.01); *F02D 2200/0802* (2013.01); *F02D 2200/0811* (2013.01); *F02D 2200/0812* (2013.01); *Y02T 10/47* (2013.01)

(58) Field of Classification Search
CPC ...... F01N 11/002; F01N 11/00; F01N 11/007; F01N 2550/00; F02D 41/2432; F02D 41/0235; F02D 41/22; F02D 41/222; F02D 41/2487
See application file for complete search history.

(56) References Cited

U.S. PATENT DOCUMENTS

| | | | |
|---|---|---|---|
| 4,128,005 A | 12/1978 | Arnston et al. | |
| 5,426,585 A * | 6/1995 | Stepper | F02D 41/2425 701/101 |

(Continued)

*Primary Examiner* — Freddie Kirkland, III
(74) *Attorney, Agent, or Firm* — Foley & Lardner LLP

(57) ABSTRACT

An engine diagnostic tool includes a diagnostic engine calibration module structured to include a plurality of diagnostic processes for operating an internal combustion engine system of an immobilized vehicle. One or more of the plurality of diagnostic processes are structured to be an intrusive diagnostic process for the internal combustion engine system, wherein the intrusive diagnostic process causes the internal combustion engine system to operate outside of one or more calibration parameters. The diagnostic engine module is further structured to control the order and timing of each diagnostic process in the plurality of diagnostic processes.

7 Claims, 4 Drawing Sheets

(51) Int. Cl.
*F02D 41/04* (2006.01)
*F02D 41/24* (2006.01)

(56) References Cited

U.S. PATENT DOCUMENTS

| | | | | |
|---|---|---|---|---|
| 5,781,700 A | * | 7/1998 | Puskorius | F02D 41/1405 706/14 |
| 6,003,307 A | | 12/1999 | Naber et al. | |
| 6,181,992 B1 | | 1/2001 | Gurne et al. | |
| 6,466,861 B2 | * | 10/2002 | Little | F02D 41/2487 701/114 |
| 6,571,191 B1 | * | 5/2003 | York | F02D 41/2422 702/104 |
| 7,818,098 B2 | * | 10/2010 | Koepf | G06F 11/25 701/1 |
| 7,970,496 B2 | * | 6/2011 | Koepf | G06F 11/25 701/1 |
| 8,091,416 B2 | * | 1/2012 | Wang | F01N 3/2066 73/114.75 |
| 8,205,440 B2 | | 6/2012 | Levijoki et al. | |
| 8,229,693 B2 | | 7/2012 | Willard et al. | |
| 8,286,419 B2 | | 10/2012 | Levijoki et al. | |
| 8,364,339 B2 | | 1/2013 | Willard et al. | |
| 8,892,326 B2 | * | 11/2014 | Frashure | B60T 8/885 340/545.6 |
| 2007/0078576 A1 | * | 4/2007 | Salman | G07C 5/0808 701/31.4 |
| 2010/0023292 A1 | * | 1/2010 | Willard | G07C 5/08 702/89 |
| 2010/0180576 A1 | * | 7/2010 | Wang | F01N 3/2066 60/276 |
| 2010/0299020 A1 | * | 11/2010 | Koepf | G06F 11/25 701/1 |
| 2014/0150407 A1 | * | 6/2014 | Van Niekerk | F01N 3/2066 60/274 |

* cited by examiner

EXHAUST AFTERTREATMENT SYSTEM DIAGNOSTIC AND CONDITIONING

CROSS-REFERENCE TO RELATED APPLICATION

This application claims the benefit of and priority to U.S. Provisional Patent Application No. 61/821,143 entitled "EXHAUST AFTERTREATMENT SYSTEM DIAGNOSTIC AND CONDITIONING," filed May 8, 2013, which is incorporated herein by reference in its entirety.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing.

Generally, emission requirements vary according to engine type. Emission tests for compression-ignition (diesel) engines typically monitor the release of carbon monoxide (CO), unburned hydrocarbons (UHC), diesel particulate matter (PM) such as ash and soot, and nitrogen oxides (NOx). Oxidation catalysts, such as diesel oxidation catalysts (DOC) have been implemented in exhaust gas aftertreatment systems to oxidize at least some particulate matter in the exhaust stream, reduce unburned hydrocarbons and CO in the exhaust to less environmentally harmful compounds, and oxidize nitric oxide (NO) to form nitrogen dioxide ($NO_2$), which is used in the NOx conversion on an selective catalytic reduction (SCR) catalyst. To remove the particulate matter, a particulate matter (PM) filter is typically installed downstream from the oxidation catalyst or in conjunction with the oxidation catalyst. However, some exhaust aftertreatment systems do not have a PM filter. With regard to reducing NOx emissions, NOx reduction catalysts, including SCR systems, are utilized to convert NOx (NO and $NO_2$ in some fraction) to $N_2$ and other compounds. Further, some systems include an ammonia oxidation (AMOX) catalyst downstream of the SCR catalyst to convert at least some ammonia slipping from the SCR catalyst to $N_2$ and other less harmful compounds.

Exhaust aftertreatment system components can be susceptible to failure and degradation. Because the failure or degradation of components may have adverse consequences on the performance and emission-reduction capability of the exhaust aftertreatment system, the detection and, if possible, correction of failed or degraded components is desirable. In fact, some regulations require on-board diagnostic (OBD) monitoring or testing of many of the various components and performance of an exhaust aftertreatment system. When equipped on vehicles, most monitoring and testing of aftertreatment system components and performance are performed during on-road operation of the vehicle (e.g., while the vehicle is being driven on the road). Although such monitoring and testing while the vehicle is in use may be convenient, the efficacy of the monitoring and testing diagnostic procedures, as well as any recovery procedures, are limited because the engine cannot be operated outside of a given on-road calibrated operating range. Additionally, because on-road operating demands typically have priority over diagnostic and performance recovery procedures, the order, timing, and control of such procedures may be less than ideal.

SUMMARY

One embodiment relates to an apparatus that includes a diagnostic engine calibration module. The diagnostic engine calibration module is structured to include a plurality of diagnostic processes for operating an internal combustion engine system of an immobilized vehicle. Each diagnostic process is structured to bring the internal combustion engine system to one or more operating points prior to running a subsequent diagnostic process to enable a diagnosis of a component of the internal combustion engine system relating to the currently ran diagnostic process. The diagnostic engine calibration module is further structured to control the order and timing of each diagnostic process in the plurality of diagnostic processes.

Another embodiment relates to internal combustion engine system, comprising an internal combustion engine system, and a controller comprising memory designated for storage of an engine calibration program and a diagnostic engine calibration program, the engine calibration program structured to operate the internal combustion engine system while the internal combustion engine system is mobilized. The diagnostic engine calibration program includes a plurality of diagnostic processes for operating the internal combustion engine system while the internal combustion engine system is immobilized. The diagnostic processes include a diesel particulate filter (DPF) pressure fault process and a DPF ash restriction process. Each diagnostic process is structured to bring the internal combustion engine system to one or more operating points prior to running a subsequent diagnostic process to enable a diagnosis of a component of the internal combustion engine system relating to the currently ran diagnostic process. The diagnostic engine calibration program is further structured to control the order and timing of each diagnostic process in the plurality of diagnostic processes.

Still another embodiment relates to a method for diagnosing and conditioning an internal combustion engine system of a vehicle. The method includes immobilizing the vehicle in a controlled environment; removing a production engine calibration program from an electronic control unit of the internal combustion engine system; uploading a diagnostic engine calibration program to the electronic control unit; running the diagnostic engine calibration program while the vehicle is immobilized in the controlled environment, the diagnostic engine calibration including a plurality of diagnostic processes for operating an immobilized vehicle; removing the diagnostic engine calibration program from the electronic control unit after completion of the plurality of commands; and uploading the production engine calibration program to the electronic control unit. Each diagnostic process is structured to bring the internal combustion engine system to one or more operating points prior to running a subsequent diagnostic process to enable a diagnosis of a component of the internal combustion engine system relating to the currently ran diagnostic process.

Yet another embodiment relates to an apparatus comprising a diagnostic engine calibration module structured to include a plurality of diagnostic processes for operating an internal combustion engine system of a vehicle. Each diagnostic process is structured to bring the internal combustion engine system to one or more operating conditions prior to running a subsequent diagnostic process to enable a diagnosis of a component of the internal combustion engine system relating to the currently ran diagnostic process. The diagnostic engine calibration module is structured to activate the plurality of diagnostic processes in the following order: a DPF pressure sensor fault process; a DPF pressure check fault process; a DEF deposit regeneration process; a DOC performance test; a low NOx sensor rationality test; a SCR performance test before an SCR regeneration event; an SCR performance test with an SCR regeneration event; a DPF ash restriction process; a high NOx sensor rationality test; a DOC and DPF temperature sensor rationality test; and a SCR temperature sensor rationality test.

The subject matter of the present application has been developed in response to the present state of the art, and in particular, in response to the problems and needs in the exhaust aftertreatment system diagnostic and recovery art that have not yet been fully solved by currently available diagnostic and recovery techniques. Accordingly, the subject matter of the present application has been developed to provide methods, systems, and apparatus for diagnosing the condition and recovering the performance of exhaust aftertreatment system components.

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

DETAILED DESCRIPTION

Referring to the figures generally, systems and methods of troubleshooting an engine system are shown according to various example embodiments. According to the present disclosure, a calibration program is structured to be applied to an engine control module ("ECM"). Upon application, the calibration program, via the ECM, causes one or more intrusive diagnostic tests. The diagnostic tests are structured to cause the engine to operate at various operating parameters. The diagnostic tests allow a technician to trouble shoot the aftertreatment system efficiently and quickly. Moreover, the diagnostic tests allow the technician to quickly diagnose which component(s) of the aftertreatment system are malfunctioning or about to malfunction. This enables a relatively faster turnaround for repair sessions for the aftertreatment system, which may save the customer time and money. After completion of the diagnostic session, the calibration program is removed from the ECM, such that the ECM operates according to the pre-existing engine set points thereafter.

As used herein, the term "intrusive" (in regard to performing one or more diagnostic tests) is used to refer to operating the engine of the vehicle outside of various preset engine operating points (e.g., there may be a limit on the maximum engine speed). More specifically, "intrusive diagnostic tests" refer to overriding various set engine operating points to perform the tests. For example, many engine operating points are set to be in compliance with one or more vehicular laws (e.g., emissions). By overriding one or more of these operating points, the engine may be forced into non-compliance with one or more vehicular laws. As described herein, a calibration program is uploaded into the ECM of the vehicle to cause operation of the intrusive diagnostics tests. These tests allow for the efficient diagnosis of various components of the engine system (to determine which one, if any, needs to be repaired, replaced, or otherwise inspected).

Figure 1:
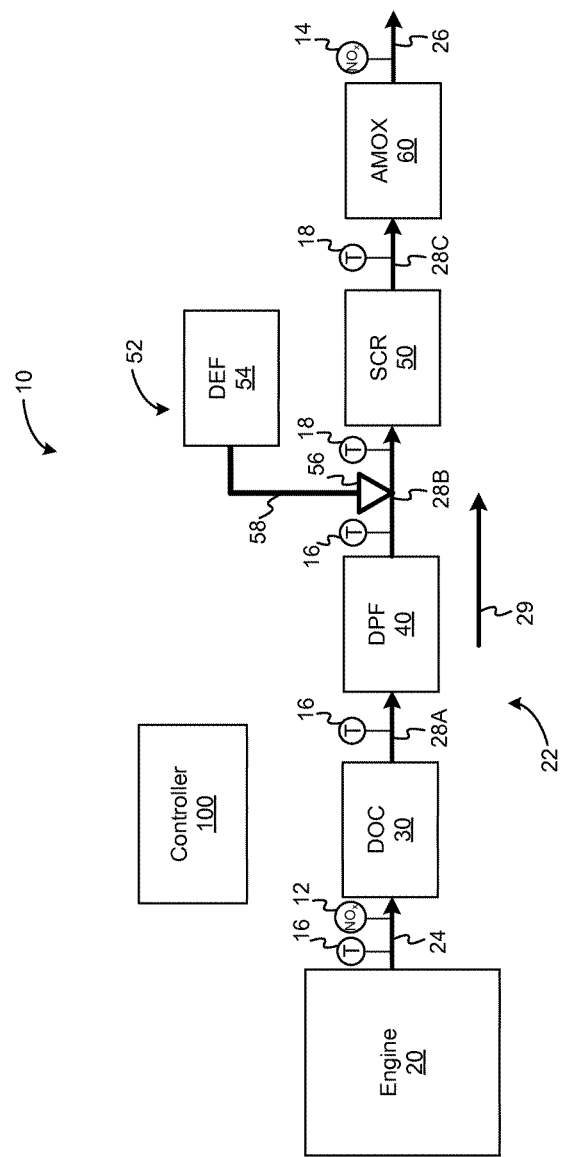
FIG. 1 is a schematic of an engine system including an aftertreatment system according to an example embodiment.

FIG. 1 depicts one embodiment of an engine system 10. The main components of the engine system 10 include an internal combustion engine 20 and an exhaust aftertreatment system 22 in exhaust gas-receiving communication with the engine 20. The internal combustion engine 20 can be a compression-ignited internal combustion engine, such as a diesel-fueled engine, or a spark-ignited internal combustion engine, such as a gasoline-fueled engine operated lean. Although not shown, on the air intake side, the engine system 10 can include an air inlet, inlet piping, a turbocharger compressor, and an intake manifold. The intake manifold includes an outlet that is operatively coupled to compression chambers of the internal combustion engine 20 for introducing air into the compression chambers.

Within the internal combustion engine 20, air from the atmosphere is combined with fuel, and combusted, to power the engine. The fuel comes from a fuel tank (not shown) through a fuel delivery system including, in one embodiment, a fuel pump and common rail to the fuel injectors, which inject fuel into the combustion chambers of the engine 20. Fuel injection timing can be controlled by the controller 100 via a fuel injector control signal.

Combustion of the fuel and air in the compression chambers of the engine 20 produces exhaust gas that is operatively vented to an exhaust manifold (not shown). From the exhaust manifold, a portion of the exhaust gas may be used to power a turbocharger turbine. The turbocharger turbine drives the turbocharger compressor, which may compress at least some of the air entering the air inlet before directing it to the intake manifold and into the compression chambers of the engine 20.

The exhaust aftertreatment system 10 includes the controller 100 (which also can form part of the overall engine system 10), a diesel particular filter (DPF) 40, a diesel oxidation catalyst (DOC) 30, a selective catalytic reduction (SCR) system 52 with an SCR catalyst 50, and an ammonia oxidation (AMOX) catalyst 60. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOX catalyst 50 and exits the AMOX catalyst into outlet piping 26 before the exhaust gas is expelled from the system 22. Based on the foregoing, in the illustrated embodiment, the DOC 30 is position upstream of the DPF 40 if present and the SCR catalyst 50, and the SCR catalyst 50 is positioned downstream of the DPF 40 when present and upstream of the AMOX catalyst 60. However, in alternative embodiments, other arrangements of the components of the exhaust aftertreatment system 22 are also possible.

The DOC 30 can have any of various flow-through designs known in the art. Generally, the DOC 30 is configured to oxidize at least some particulate matter, e.g., the soluble organic fraction of soot, in the exhaust and reduce unburned hydrocarbons and CO in the exhaust to less environmentally harmful compounds. For example, the DOC 30 may sufficiently reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In this manner, the level of $NO_2$ exiting the DOC 30 is equal to the $NO_2$ in the exhaust gas generated by the engine 20 plus the $NO_2$ converted from NO by the DOC. Accordingly, one metric for indicating the condition of the DOC 30 is the $NO_2$/NOx ratio of the exhaust gas exiting the DOC.

In addition to treating the hydrocarbon and CO concentrations in the exhaust gas, the DOC 30 can also be used in the controlled regeneration of the DPF 40, SCR catalyst 50, and AMOX catalyst 60. This can be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOX catalyst 60. The amount of unburned HC added to the exhaust gas is selected to achieve the desired temperature increase or target controlled regeneration temperature.

The DPF 40 can be any of various flow-through designs known in the art, and configured to reduce particulate matter concentrations, e.g., soot and ash, in the exhaust gas to meet requisite emission standards. The DPF 40 captures particulate matter and other constituents, and thus needs to be periodically regenerated to burn off the captures constituents. Additionally, the DPF 40 may be configured to oxidize NO to form $NO_2$ independent of the DOC 30.

As discussed above, the SCR system 52 includes a reductant delivery system with a reductant (e.g., DEF) source 54, pump (not shown) and delivery mechanism or doser 56. The reductant source 54 can be a container or tank capable of retaining a reductant, such as, for example, ammonia ($NH_3$), DEF (e.g., urea), or diesel oil. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50.

In some embodiments, the reductant can either be ammonia or DEF, which decomposes to produce ammonia. The ammonia reacts with NOx in the presence of the SCR catalyst 50 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. However, as discussed above, the chemical reduction of $NO_2$ to $N_2$ and $H_2O$ typically is the most efficient chemical reaction. Therefore, in general, the more $NO_2$ in the exhaust gas stream compared to NO, the more efficient the $NO_x$ reduction performed by the SCR catalyst. Accordingly, the ability of the DOC 30 to convert NO to $NO_2$ directly affects the NOx reduction efficiency of the SCR system 150. Put another way, the NOx reduction efficiency of the SCR system 52 corresponds at least indirectly to the condition or performance of the DOC 30. However, primarily, the NOx reduction efficiency of the SCR system 52 corresponds with the condition or performance of SCR catalyst 50.

The SCR catalyst 50 can be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 50 is a zeolite-based catalyst.

The AMOX catalyst 60 can be any of various flow-through catalysts configured to react with ammonia to produce mainly nitrogen. Generally, the AMOX catalyst 60 is utilized to remove ammonia that has slipped through or exited the SCR catalyst 60 without reacting with $NO_x$ in the exhaust. In certain instances, the aftertreatment system 22 can be operable with or without an AMOX catalyst. Further, although the AMOX catalyst 60 is shown as a separate unit from the SCR catalyst 52, in some implementations, the AMOX catalyst can be integrated with the SCR catalyst, e.g., the AMOX catalyst and the SCR catalyst can be located within the same housing. The condition of the AMOX catalyst 60 can be represented by the performance of the AMOX catalyst (i.e., the ability of the AMOX catalyst to convert ammonia into mainly nitrogen).

Various sensors, such as NOx sensors 12, 14 and temperature sensors 16, 18, may be strategically disposed throughout the exhaust aftertreatment system 22 and may be in communication with the controller 100 to monitor operating conditions of the engine system 10. In one embodiment, the NOx sensor 12 is positioned upstream of the SCR catalyst 50 and configured to detect the concentration of NOx in the exhaust gas upstream of the SCR catalyst (e.g., entering the SCR catalyst). In the present embodiment, the upstream NOx sensor 12 is positioned upstream of the DOC 30, but in other embodiments, the upstream NOx sensor 12 can be positioned at any of various locations upstream of the SCR catalyst 50. The NOx sensor 14 is positioned downstream of the SCR catalyst 50 and configured to detect the concentration of NOx in the exhaust gas downstream of the SCR catalyst (e.g., exiting the SCR catalyst). In the present embodiment, the downstream NOx sensor 14 is positioned downstream of the AMOX catalyst 60 (e.g., at a tailpipe of the system), but in other embodiments, the downstream NOx sensor may be positioned upstream of the AMOX catalyst 60.

The temperature sensors 16 are associated with the DOC 30 and DPF 40, and thus can be defined as DOC/DPF temperature sensors 16. The DOC/DPF temperature sensors are strategically positioned to detect the temperature of exhaust gas flowing into the DOC 30, out of the DOC and into the DPF 40, and out of the DPF before being dosed with DEF by the doser 56. The temperature sensors 18 are associated with the SCR catalyst 50 and thus can be defined as SCR temperature sensors 18. The SCR temperature sensors 18 are strategically positioned to detect the temperature of exhaust gas flowing into and out of the SCR catalyst 50.

Although not shown, the engine system 10 and exhaust aftertreatment system 22 includes many other types of sensors for detecting other characteristics of the system at various locations throughout the systems. Also, the systems 10, 22, including the controller 100, may include various virtual sensors for estimating various characteristics of the system.

Although the exhaust aftertreatment system 22 shown includes one of an DOC 30, DPF 40, SCR catalyst 50, and AMOX catalyst 60 positioned in specific locations relative to each other along the exhaust flow path, in other embodiments, the exhaust aftertreatment system may include more than one of any of the various catalysts positioned in any of various positions relative to each other along the exhaust flow path as desired. Further, although the DOC 30 and AMOX catalyst 60 are non-selective catalysts, in some embodiments, the DOC and AMOX catalyst can be selective catalysts.

Figure 2:
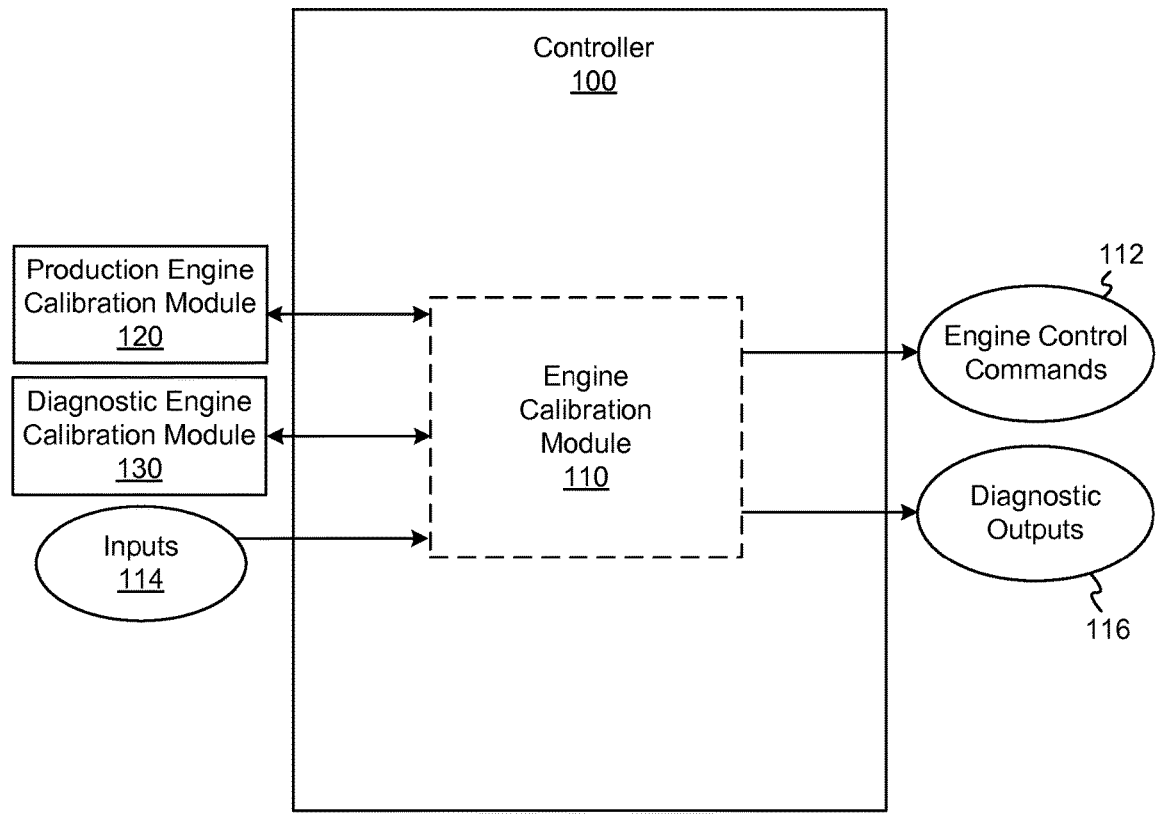
FIG. 2 is a schematic of a controller for an engine system according to an example embodiment.

The controller 100 controls the operation of the engine system 10 and associated sub-systems, such as the internal combustion engine 20 and the exhaust gas aftertreatment system 22. The controller 100 is depicted in FIGS. 1 and 2 as a single physical unit, but can include two or more physically separated units or components in some embodiments if desired. Generally, the controller 100 receives multiple inputs 114, processes the inputs, and transmits multiple commands or outputs. The multiple inputs 114 may include sensed measurements, from the sensors, estimates from virtual sensors, and various user inputs. The inputs 114 are processed by the controller 100 using various algorithms, stored data, and other inputs to update the stored data and/or generate output values. The generated output values and/or commands are transmitted to other components of the controller and/or to one or more elements of the engine system 10 to control the system to achieve desired results.

Generally, the controller 100 includes various modules for controlling the operation of the engine system 10. For example, the controller 100 includes memory reserved for an engine calibration module 110 containing calibrated instructions for operation of the engine system 10. As is known in the art, the controller 100 and its various modular components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

Referring to FIG. 2, the controller 100, which can be the electronic control module (ECM) or electronic control unit (ECU) of a vehicle, includes memory reserved for an engine calibration module 110 or program with instructions for operating the engine system 10. When executed, the engine calibration module 110 generates engine control commands 112 for actuating the various components of the engine system 10 necessary for operation of the engine system according to the engine calibration set by the module. The engine calibration module 110 also receives inputs 114 from various sources, such as one or more of the plurality of sensors of the engine system 10, and user input, such as actuation of an accelerator pedal or activation of an auxiliary system, and provides diagnostic outputs 116.

As used herein, the term "calibration module" refers to stored operation parameters that are mostly permanent. They are mostly permanent because end-users are usually prevented from adjusting the operation parameters stored in the calibration module (i.e., the calibration parameters). For reference, in comparison, an adjustable operation parameter may include the cruise set-speed, which is adjustable by an end user. In regard back to the calibration module parameters, the original equipment manufacturer ("OEM") can usually adjust them. Accordingly, these parameters are usually engineering-type parameters and/or closely-held OEM parameters (e.g., a maximum power output of the engine). According to the present disclosure, the diagnostic engine calibration module 130 includes commands to cause the diagnostic tests described herein to be intrusive, such that one or more engineering-type and/or closely-held OEM parameters are overridden during operating of the commands.

As such, the engine calibration module 110 may include instructions that cause the otherwise permanent operation parameters (i.e., the engineering-type and/or closely-held OEM set parameters) to be overridden. Thus, as mentioned above, in one embodiment, the engine calibration module 110 is structured as an intrusive diagnostics module (as opposed to a non-intrusive diagnostics module, where the commands for operating the engine system do not cause the engine to operate outside of the mostly permanent operation set points of the engine system). By overriding these set points, the engine may operate outside of various vehicular laws and/or on-road standards (e.g., cause an unacceptable amount of emissions). As an example, take a usually permanent parameter: the commands of the vehicle operator (e.g., depression of the accelerator pedal) are always obeyed by the controller (e.g., ECM). However, the engine calibration module 110 may override this permanent parameter to perform its stored operations and disregard the commands from the operator (hence, intrusive). This type of control may be illegal if used on a road (i.e., outside the service bay) due to the operations of the module 110 not being able to react to other drivers and/or obey posted laws.

Referring now back to FIG. 2, prior to use by an end-user, a production engine calibration module 120 is uploaded to the controller 100 and saved in the memory reserved for the engine calibration module 110. In essence, after being uploaded, the production engine calibration module 120 becomes the engine calibration module 110 for operation of the engine system 10. The production engine calibration module 120 includes instructions that are specifically calibrated for operating the engine system 10 under normal on-road operation of the vehicle housing the engine system. Accordingly, the production engine calibration module 120 calibrates the engine system 10 to meet engine production standards or regulations set by regulatory agencies. In other words, the operating parameters or conditions of the engine system 10 are purposefully limited in order to comply with various standards associated with normal on-road use of the vehicle, such as emissions standards, fuel consumption standards, temperature standards, and on-board diagnostic ("OBD") standards. Therefore, although the production engine calibration module 120 may include instructions for conducting diagnostic testing of the engine system 10, the operating parameters of the diagnostic tests are constrained due to the need for compliance with the regulated normal on-road standards. Similarly, although the production engine calibration module 120 may include instructions for conducting recondition or recovery processes (e.g., regeneration events) for reconditioning or recovering the performance of various components of the engine system 10, the efficacy of the processes may be limited due to the constraints imposed by the necessary compliance with the regulated normal on-road standards. As mentioned above, these are the mostly permanent operating parameters that are set by the calibration module 120.

After delivery to an end-user, and likely after some use of the vehicle by the end-user, the vehicle may be immobilized or rendered stationary (e.g., maintained in park or out-of-gear) for a variety of reasons. For example, the vehicle may be brought into a service bay for scheduled or non-scheduled maintenance (e.g., repairs). While in the service bay, the vehicle remains immobilized, while the engine system 10 of the vehicle remains operational. In this manner, and because the vehicle is maintained in the controlled environment of the service bay (i.e., the vehicle is not being operated on the road), the operation of the vehicle is not constrained by the regulated normal on-road standards.

While in the service bay, whether before or after the maintenance is performed, the production engine calibration module 120 is removed or deleted from the controller 100, and is replaced by the diagnostic engine calibration module 130 as the engine calibration module 110 of the controller, which allows for the intrusive diagnostic tests (described herein) to be performed. Although not shown, a diagnostic tool can be coupled in data transmitting communication with the controller 100 via a data communication link or bus. The diagnostic tool can be configured to delete or command deletion of the production engine calibration module 120 from the memory reserved for the engine calibration module 110. Alternatively, the diagnostic tool can remove a copy of the production engine calibration module 120, as indicated by bi-directional arrows in FIG. 2, and store the production engine calibration module 120 on the tool.

After the production engine calibration module 120 is deleted or removed by the tool, the tool can be used to upload the diagnostic engine calibration module 130 into the memory reserved for the engine calibration module 110. In this manner, the original production engine calibration module 120 is replaced by the diagnostic engine calibration module 130. The diagnostic engine calibration module 130 includes instructions that are specifically calibrated for operating the engine system 10 under a dedicated diagnostic operation of the vehicle housing the engine system. The instructions include one or more diagnostic processes that are structured to bring the internal combustion engine system to one or more operating conditions prior to performance of a subsequent diagnostic process to enable diagnosis of a component in the internal combustion engine system relating to the currently ran diagnostic process. As mentioned above, because operation of the vehicle is free of regulated constraints in the controlled environment of the service bay, the dedicated diagnostic operation of the vehicle and engine system 10 utilizes operating conditions not otherwise allowed during normal on-road use of the vehicle for achieving more accurate and efficient diagnostic and reconditioning results. When the diagnostic and reconditioning processes of the diagnostic engine calibration module 130 are complete, the diagnostic engine calibration module 130 is removed from the controller 100 (e.g., either deleted or a copy is removed, as indicated by bi-directional arrows in FIG. 2) and replaced by the production engine calibration module 120 via operation of the tool. After the production engine calibration module 120 is uploaded back into the memory reserved for the engine calibration module 110, the vehicle and engine system 10 is equipped to return to normal on-road operating conditions (i.e., engine system operation within the previously existing mostly permanent operation parameters of the production engine calibration module 120).

Figure 3:
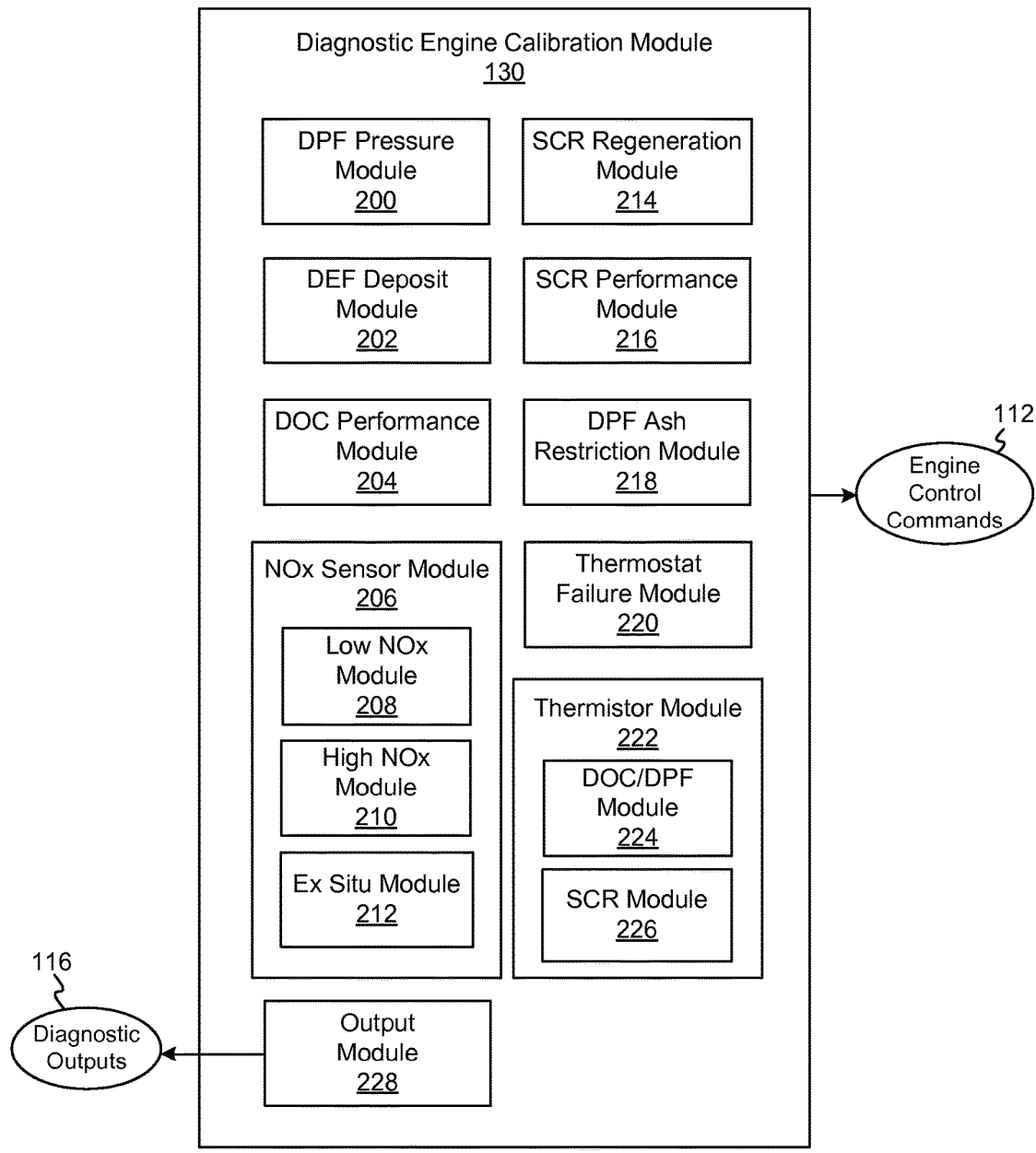
FIG. 3 is a schematic of a diagnostic engine calibration module for the controller of FIG. 2 according to an example embodiment.

Referring to FIG. 3, the diagnostic engine calibration module 130 includes a plurality of modules each configured with instructions to automatically execute one or more diagnostic or reconditioning processes without user input. Additionally, the diagnostic engine calibration module 130 includes logic to automatically and sequentially control the order and timing (i.e., start and end) of the diagnostic and reconditioning processes executed by the modules. In other words, once the diagnostic engine calibration module 130 is installed and initiated, the diagnostic and reconditioning processes run automatically without user intervention (e.g., a driver is not controlling operation of the vehicle). The diagnostic engine calibration module 130 generates the engine control commands 112 that actuate the components of the engine system 10. In one embodiment, the diagnostic engine calibration module 130 is an intrusive diagnostics tool, such that the commands cause an override of otherwise-set engine operating parameters (e.g., maximum power output). Accordingly, one or more of the tests described herein (in regard to the modules) may also be intrusive. The diagnostic engine calibration module 130 may also provide diagnostic outputs 116 that may include indications of the conditions or health of the engine system 10, and its various components, and a prediction of the remaining life of such components.

The modules (and accompanying diagnostic processes) of the diagnostic engine calibration module 130 may now be described. According to one example, the diagnostic processes are arranged in the following order of operation: 1)

DPF pressure sensor fault process while the ECM is on and the engine is off; 2) DPF pressure check fault process while the engine and ECM are on; 3) a DEF deposit regeneration process; 4) DOC performance process; 5) a low NOx sensor rationality test; 6) a SCR performance test before an SCR regeneration; 7) an SCR performance test after an SCR regeneration event (e.g., desulfurization (DeSOx)); 8) if an SCR fault is received, perform a doser diagnostic test; 9) DPF ash restriction test; 10) a high NOx sensor rationality test; and 11) compare DOC/DPF thermistors to one another, compare SCR thermistors to one another, and perform another NOx sensor rationality test.

This example order of operations allows the diagnosis (malfunctioning, potentially malfunctioning, and/or correctly function) of one or more components in the internal combustion engine system (including the exhaust aftertreatment system). The example order of operations may be briefly explained as follows.

The DPF pressure check fault process is performed when the engine is off (but the ECM is on) and then when the engine is on (processes 1-2). When the engine is off, no air should be moving through the engine such that the pressure sensor reading (differential across the DPF) is near zero. When the engine is on, the sensor (or sensors) should measure a substantially greater pressure difference across the DPF. This may be preset to determine whether the DPF is functioning correctly. In one embodiment, when the engine is turned on, the engine will accelerate to approximately 1800 revolutions-per-minute. A decomposition reactor (converts diesel exhaust fluid into ammonia) is allowed to burn diesel exhaust fluid deposits (i.e., DEF deposit regeneration process, process 3). During the burn, the DOC performance may be monitored (process 4). Because of the high engine speed, a higher flow rate is going through the exhaust aftertreatment system, which makes determining potential issues with the DOC easier. In one embodiment, the fan is locked during this process and a fault code is set to trigger if the thermostat is leaking Process 3 enables the diagnosis of the DOC. In some embodiments, as described below, a DOC recondition process is also performed (which would occur here, before process 5). At process 5, a low NOx sensor test is performed; usually, this test is performed at 100 ppm NOx (low NOx module 208). At processes 6 and 7, an SCR performance test may be performed before and after an SCR regeneration event (e.g., DeSOx). The performance test may be run at approximately 350 g/s exhaust flow and 350° C. exhaust temperatures. These processes may enable diagnosis of the SCR component. At process 8, if an SCR fault is received (i.e., the SCR is not performing according to various preset parameters, possibly embodied in one or more fault codes), a doser diagnostic test may be performed. The doser diagnostic test is a test to check the flow rate of the doser (i.e., of the reductant through the doser/injector). Thus, one or more flow sensors may be used with the doser 56 that monitor the flow rate of a reductant through the doser. Because the fuel doser/injector can plug up with carbon, the doser diagnostic test is performed to ensure a proper flow rate through the doser/injector. The doser diagnostic test may also include measuring the change in pressure across a fixed orifice size of the injector. If the change in pressure is above (in some embodiments, below) a predetermined threshold, this may indicate that the doser/injector is plugged or clogged with carbon and needs to be replaced or serviced. At process 9, a DPF ash restriction test may be performed. A fault code may be triggered if too much ash is detected. Accordingly, the DPF is being diagnosed at process 9. After this test, the engine may be run at 1600 revolutions-per-minute (a relatively high speed for a compression-ignition engine (diesel) that equates to a relatively higher exhaust flow rate). At process 10, a high NOx sensor test is performed (e.g., 1000 ppm NOx). After a predetermined amount of time (e.g., five minutes) at the preset engine speed (e.g., 1600 revolutions-per-minute), the engine may HC doser purge. After this, the engine may idle for another amount of predetermined amount of time (e.g., five minutes). Upon completion, at process 11, the DOC/DPF thermistors are compared to one another, the SCR thermistors to one another, and (in some embodiments) a third NOx sensor rationality test is performed. In one example configuration, a fault code is triggered if the DOC/DPF thermistors are outside of +/−25° C. of each other. In another example configuration, a fault code is triggered if the SCR thermistors are outside of +/−25° C. of each other. After these two checks, the engine may return to idle. At idle, the NOx sensors may be left on for a little while longer (adjustable). In one example, a service technician may datalog the NOx sensor reading after removing the NOx sensor from the system and letting it hang out in the open.

As can be seen, this order of operations allows the diagnosis of one or more components in the exhaust after treatment system. This order may be rearranged in other embodiments. The above is a brief overview of the diagnostic processes of the diagnostic engine calibration module 130. The details of these processes may be more fully described in regard to the sub-modules of the diagnostic engine calibration module 130.

The DPF pressure module 200 is structured to perform a DPF pressure check fault process. In this process, the module 200 is configured to set the fault thresholds for the pressure differential across the DPF 40 and the DPF outlet pressure. Because the diagnostic and reconditioning processes executed by the modules of the diagnostic engine calibration module 130 are performed on an immobilized vehicle in a controlled or contained environment, the fault thresholds for the DPF pressure differential and DPF outlet pressure are tighter or less conservative (e.g., threshold values are within a smaller range) than with diagnostic processes associated with normal on-road operation of the vehicle. The DPF pressure module 200 sets the DPF pressure differential and DPF outlet pressure fault thresholds upon activation of the diagnostic engine calibration module 130, which may occur upon start-up of the engine. Thus, the technician may monitor the pressure difference across the DPF 40 while the engine is on and the ECM is on. If the pressure differential is above a predetermined maximum amount, this may indicate that the DPF is not removing enough particles (i.e., too high of flow rate). If the pressure differential is below a predetermined minimum amount, this may indicate that the filter is full of particles and the exhaust flow is restricted (i.e., the filter may need to be replaced or cleaned). In this event, a DPF ash restriction test may be utilized (described herein).

In one example, the DPF pressure module 200 is structured to perform a DPF pressure sensor fault process. This process includes activating the ECM while the internal combustion engine system remains off. In these operating conditions, the internal combustion engine is not moving air through the system (i.e., the DPF). Accordingly, the pressure differential across the DPF should be near zero. This test may indicate the functioning of the pressure sensor (in some embodiments, pressure sensors) for the DPF. If the technician notices a pressure differential not in align with this expectation (may be based on a predetermined percentage difference from zero that is acceptable), the technician may be alerted to a possible malfunction of the DPF and would be compelled to examine the DPF further. In one embodiment, the DPF pressure sensor fault process is structured to be performed prior to the DPF pressure check fault process.

The DEF deposit module 202 is configured to execute a regeneration event of the exhaust aftertreatment system 22 to remove DEF deposits, as well as soot and sulfur deposits, which may have formed within the system (process 3). Such a DEF regeneration event promotes a clean and relatively DEF deposit free environment to conduct other diagnostic and reconditioning processes. In one implementation, the regeneration event executed by the DEF deposit module 202 includes maintaining the engine speed of the engine 20 at a relatively low desired engine speed (e.g., about 900 RPM), increasing the temperature of the exhaust gas flowing through the system 22 to a desired temperature (e.g., about 525-650° C.), and disabling DEF dosing all for a predetermined amount of time. The particular conditions of the DEF regeneration event executed by the DEF deposit module 202 are not conducive to, and may not be allowable during, normal on-road operation of the vehicle. This is based on the intrusive nature of the test. For example, during normal on-road operation of the vehicle, exhaust gas temperatures reaching about 525-650° C. and disabling DEF dosing may prevent the engine system 10 from meeting emissions standards. However, because meeting emissions standards is not a concern in the immobilized, controlled environment, the particular conditions of the DEF regeneration event can be tuned to more effectively remove DEF and other deposits within the system compared to normal on-road regeneration events. As mentioned above, in one embodiment, this regeneration event occurs after the SCR activity check.

The DOC performance module 204 is configured to monitor and evaluate the performance of the DOC 30, and recondition the DOC if necessary. The operating conditions of the DOC performance test and recondition diagnostic executed by the DOC performance module 204 are also intrusive tests, which may not be acceptable during normal on-road operating conditions. Relatively high temperatures and high NOx may act to recondition the DOC. The high NOx and high temperatures may be accomplished via adjustment to the EGR fraction and/or the start of injection (e.g., injection timing). This test utilizes the high temperature and high flow to clean the soot, fuel, and/or Sulfur from the DOC. The DOC performance module 204 may also enable monitoring of the health of the DOC. In one embodiment, the DOC performance module 204 is structured to turn on HC dosing. This inhibits the $NO_2$ reaction in the DOC. From this and the NOx conversion rate, differentiation is possible between the DOC's health to $NO_2$ conversion versus the hydrocarbon conversion rate. Accordingly, the oxidation rate of NO to $NO_2$ may be monitored as a function of HC dosing to determine whether the conversion rate is within predetermined acceptable standards.

The NOx sensor module 206 includes several sub-modules each associated with a separate diagnostic test associated with the NOx sensors 12, 14 of the engine system 10. Following the DOC performance and reconditioning diagnostic of the DOC performance module 204, the low NOx module 208 of the NOx sensor module 206 is configured to perform a rationality check of the NOx sensors 12, 14 at a relatively low concentration of engine out NOx (e.g., between about 75 ppm and about 100 ppm, where "ppm" stands for parts-per-million). Moving the start of injection or the amount of EGR fract can achieve this. Accordingly, the NOx sensor error may be represented as a function of NOx ppm. The low NOx rationality check includes disabling DEF dosing, determining the difference between the NOx concentrations detected by the SCR upstream and downstream NOx sensors 12, 14, setting fault thresholds for the NOx within a relatively tight range, and comparing the NOx concentration difference with the fault thresholds. Such a low NOx rationality check cannot be performed during normal on-road operation of the vehicle as disabling DEF dosing may prevent the engine system 10 from meeting emissions standards required during normal on-road operation.

The SCR regeneration module 214 is configured to thermally and chemically regenerate the SCR catalyst 50 to remove sulfur deposits (DeSOx) from the SCR catalyst. In one implementation, the SCR regeneration event commanded by the SCR regeneration module 214 includes elevating or maintaining the exhaust gas temperature at an elevated level and reducing or maintaining the engine speed at a reduced level for a desired period of time.

After the SCR catalyst 50 has been regenerated to remove sulfur deposits, the SCR performance module 216 conducts a performance test of the regenerated SCR catalyst 50. In one implementation, the SCR performance test includes increasing the engine speed to a desired higher engine speed (e.g., 1,800 RPM) and maximizing the exhaust flow rate by closing EGR valves and manipulating the characteristics of a turbocharger. More specifically, the SCR performance test includes allowing the turbocharger to pump all the air by closing the EGR valve and pinching down the variable geometry turbocharger. The fueling injectors are manipulated in such a way that helps build boost and create heat for the exhaust system. In one example, once the DOC's hardware limit of 250° C. of exhaust gas temps is surpassed (intrusive nature of the test), the fuel doser is enabled to dose fuel into the exhaust. Once this happens, almost any exhaust temperature may be targeted. Generally, the exhaust temperature is chosen to be between 400 and 650° C., depending on what test is being performed. Some tests may not use the fuel doser, to keep exhaust temps low. With all these different temperatures and flows available, the SCR system heath may be mapped to compare to OBD/EPA regulations to estimate the percent life remaining or if a part should be replaced. Within this test, the most likely cause of the performance shift, for example if the DOC $NO_2$ conversion is low or the SCR is degraded, or if simply the AMOx is degraded may be identified to make the best repair possible. Essentially, the SCR performance test monitors the NOx conversion efficiency of the SCR catalyst 50 by comparing the NOx concentration readings from the upstream and downstream NOx sensors 12, 14. Additionally, the NOx conversion efficiency of the SCR catalyst 50 is tested at various DEF dosing rates (e.g., 1.0, 2.0, 3.0 ammonia-to-NOx ratios). Preferably, the SCR performance test is conducted automatically by the SCR performance module 216, but in some instances, the SCR performance test can be conducted manually.

In another example embodiment, at stand-alone emissions measurement chart may be utilized with this test. Accordingly, this test would not utilize an engine sensor. Rather, some other stand-alone sensor for NOx, $O_2$, CO, exhaust flow, and the like would be utilized with the SCR performance test.

The SCR performance module 216 may also trigger an SCR fault should the performance of the SCR catalyst 50 drop below a minimum NOx conversion efficiency. If the SCR fault is triggered, the SCR performance module 216 may include additional modules that conduct a DEF testing to determine if the DEF delivery system 52 is malfunctioning and/or the concentration of DEF is low, which may indicate the DEF is diluted. In regard to the concentration of DEF being low, there may be three main causes: 1) A piece of hardware could be bad, such as the SCR, DOC or NOx sensor; 2) The DEF may not be at the proper concentration, in which a manual test can be conducted (e.g., a refractometer may be used); or 3) The DEF may not be pumping into the system, which means there may be a kink, a suction side leak pumping air instead of DEF, or an external leak. In one embodiment, items 2 and 3 must be checked out before a piece of hardware may be said to have failed. Additionally, if an SCR fault is triggered, a doser diagnostic test may also be performed. As mentioned above (process 8), the doser diagnostic test is used to check the flow rate through the doser. If the flow rate is insufficient (i.e., below a predetermined threshold), the doser may be malfunctioning and the correct exhaust temperatures may not be obtained. Accordingly, because the exhaust temperatures may not be achieved and insufficient reductant is being supplied, the NOx emissions may not be reduced to a desired level.

The DPF ash restriction module 218 is configured to conduct an ash restriction test of the DPF 40. During the regeneration events conducted by the DEF deposit module 202 and SCR regeneration module 214, the soot on the DPF 40 is removed. However, the regeneration events may not remove some species of ash from the DPF 40, such that ash may remain caked on the surface of the DPF following the regeneration events. Accordingly, the DPF ash restriction module 218 conducts the ash restriction test to determine the amount of ash that remains on the DPF 40 and triggers a fault if the amount of ash meets an upper threshold. In one embodiment, the DPF ash restriction process includes performing a pressure differential check across the DPF at a relatively high exhaust flow rate after a regeneration event of the DPF. This ensures, or substantially ensures, that the soot is gone in the DPF.

After the DPF ash restriction test is completed, the high NOx module 210 of the NOx sensor module 206 is configured to perform another rationality check of the NOx sensors 12, 14, but at a relatively high concentration of engine out NOx (e.g., about 650 ppm) and higher engine speed (e.g., 1,200 RPM). Like the low NOx rationality check, this high NOx rationality check includes disabling DEF dosing, determining the difference between the NOx concentrations detected by the SCR upstream and downstream NOx sensors 12, 14, setting fault thresholds for the NOx within a relatively tight range, and comparing the NOx concentration difference with the fault thresholds. Similar to the low NOx rationality check, this high NOx rationality check cannot be performed during normal on-road operation of the vehicle as disabling DEF dosing may prevent the engine system 10 from meeting emissions standards required during normal on-road operation.

The thermostat failure module 220 of the diagnostic engine calibration module 130 is configured to check the status of a thermostat of the engine system 10. The thermostat status check includes maintaining the engine system 10 in a steady state, such that the cooling system (not shown) of the engine system also is held in a steady state. With the cooling system in a steady state, the thermostat can be accurately checked for leakage, and a fault can be triggered should leakage be detected. Such a steady-state thermostat check can be difficult, if not nearly impossible, to conduct under normal on-road operating conditions because of the difficulty of an engine system operating under normal on-road conditions to reach a steady-state sufficiently long enough to accurately detect leakage of the thermostat.

The diagnostic engine calibration module 130 further includes a thermistor module 222 with a DOC/DPF module 224 and an SCR module 226. The DOC/DPF module 224 is configured to test the rationality of the DOC/DPF temperature sensors 16 and the SCR module 226 is configured to test the rationality of the SCR temperature sensors 18 (e.g., the DOC/DPF and SCR thermistors of process 11 described above). In one implementation, the DOC/DPF module 224 tests the rationality of the DOC/DPF temperature sensors 16 by maintaining the engine speed at a relatively higher speed (e.g., approximately 1,200 RPM to 1,600 RPM), maintaining the exhaust gas temperature at a moderate temperature (e.g., 200° C.), and maintaining the operations of the engine system 10 in a steady state. Under these conditions, the temperature readings of the DOC/DPF temperature sensors 16 are compared and a fault is triggered if a difference between the temperature readings meets an upper threshold. Similarly, in one implementation, the SCR module 226 tests the rationality of the SCR temperature sensors 18 by maintaining the engine speed at a relatively higher speed (e.g., approximately 1,200 to 1,6000 RPM), maintaining the exhaust gas temperature at a moderate temperature (e.g., 200° C.), and maintaining the operations of the engine system 10 in a steady state. Under these conditions, the temperature readings of the SCR temperature sensors 18 are compared and a fault is triggered if a difference between the temperature readings meets an upper threshold.

In one example, regarding the DOC/DPF module 224 and the SCR module 226, the SCR and DOC/DPF temperature sensors are read after the engine has been returned to an idle speed for a predetermined amount of time (e.g., five minutes). In other words, in this example, the rationality of the sensors are checked by running the engine at a relatively higher speed, letting the engine idle for a predetermined amount of time, and then taking one or more readings from the temperature sensors. The DOC/DPF temperature sensors readings are compared to each other and the SCR temperature sensor readings are compared to each other. If there is a difference between +/−25° C. in the readings, a fault may be triggered. In which case, one or more of the temperatures sensors may need to be serviced (repaired, replaced, checked again, etc.). Upon completion of these tests, the engine may return to an idle speed. At this point, (process 11 above) an additional NOx sensor rationality test may be performed.

The ex situ module 212 of the NOx sensor module 206 is configured to take and analyze readings taken from a NOx sensor (e.g., one of NOx sensors 12, 14) removed from exhaust detecting communication with the exhaust aftertreatment system 22, but remaining in an operable condition to detect NOx in the air outside of the exhaust aftertreatment system. Because air has at most negligible amounts NOx, any detection of NOx in the air by the removed NOx indicates a faulty NOx sensor. In alternative embodiments, the ex situ module 212 may be configured to facilitate the use of an external NOx sensing system that is independent from the NOx sensors 12, 14 to aid in the detection of the rationality of any one or more of the NOx sensors.

Finally, the diagnostic engine calibration module 130 includes an output module 228 configured to receive the results of the diagnostic and reconditioning tests and processes executed by the modules, analyze the results, and issue diagnostic outputs 116 representative of the results. In one implementation, the diagnostic outputs 116 includes an indication of the remaining life of the components of the engine system, or the general health of the components. Additionally, the diagnostic outputs 116 may include indications of any failed or faulty components of the system that may require reconditioning or replacement.

Figure 4:
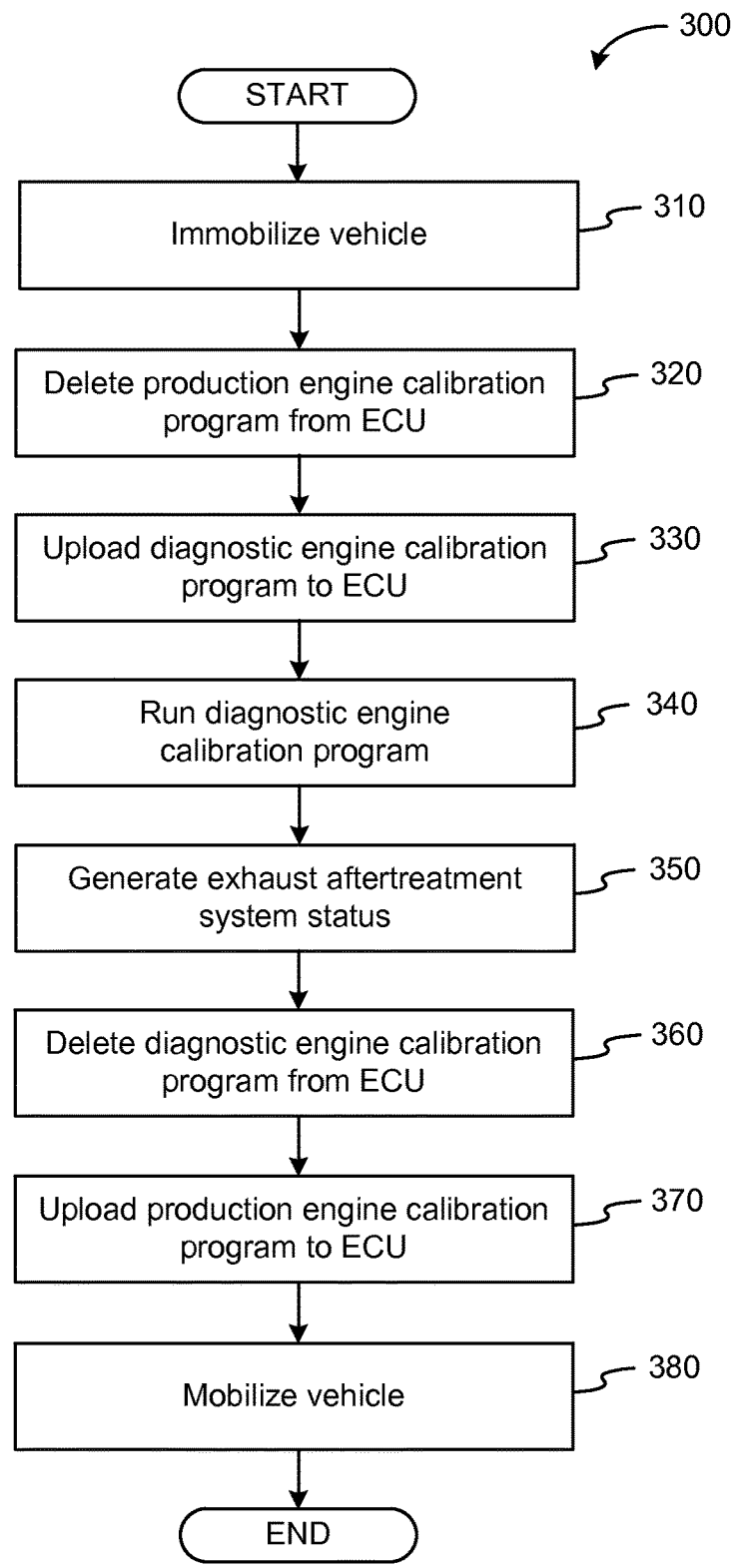
FIG. 4 is a method for diagnosing and reconditioning an engine system according to an example embodiment.

Referring to FIG. 4, a method 300 for diagnosing and reconditioning an engine system is shown. In certain implementations, the steps of the method 300 may be executed by the modules of the controller 100 described above. The method 300 begins by immobilizing the vehicle in which an engine system is housed at 310. Immobilizing the vehicle may include parking the vehicle in a service bay or other contained environment. The method 300 then includes deleting the production engine calibration program from the ECU or ECM of the vehicle at 320. The production engine calibration program may be the original engine calibration program stored on the ECU during the initial production of the vehicle. After deleting the production engine calibration program, the method 300 includes uploading a diagnostic engine calibration program to the ECU at 330 to effectively replace the deleted production engine calibration program. In this manner, the engine system is effectively recalibrated from a normal on-road operating mode conducive to operation of the vehicle on the road to an abnormal diagnostic stationary operating mode not conducive to operation of the vehicle on the road.

Following uploading of the diagnostic engine calibration program to the EDU, the method 300 runs the diagnostic engine calibration program at 340. In one implementation, the initiation of the diagnostic engine calibration program is triggered by user input, such as by holding the acceleration pedal down for a predetermined amount of time (e.g., 10 seconds) or other means of user input. Running the diagnostic engine calibration program at 340 include automatically and sequentially conducting the various tests, checks, and reconditioning processes of the modules of a diagnostic engine calibration module. The tests, checks, and reconditioning processes are conducted in a particular order, one after the other, until all desired tests, checks, and reconditioning processes are completed. In some embodiments, running the entire diagnostic engine calibration program takes about an hour. Accordingly, a vehicle can be diagnosed and reconditioned during a routine or non-routine maintenance appointment without adding significant down or wait time. According to one implementation, the diagnostic engine calibration program includes sequentially executing the following processes in order: setting of DPF pressure fault thresholds, DEF deposit regeneration, DOC performance test, low NOx sensor rationality test, SCR catalyst regeneration, SCR catalyst performance test, DPF ash restriction test, high NOx sensor rationality test, thermostat failure check, DOC/DPF temperature sensor rationality test, SCR temperature sensor rationality test, and manual NOx sensor rationality test if desired. Of course, other diagnostic and reconditioning processes can be performed in place of or in addition to those above.

After running the diagnostic engine calibration program at 340, the method 300 includes generating an exhaust aftertreatment system status at 350, which can include various outputs of the tests, estimates of the health of the components of the system, and/or predictions of the remaining life of the components of the system. After generating the exhaust aftertreatment system status at 350, the method 300 deletes or removes the engine calibration program from the ECU at 360 and uploads the production engine calibration program back to the ECU. In essence, the production engine calibration program replaces the diagnostic engine calibration program such that the engine system is effectively recalibrated from the abnormal diagnostic stationary operating mode back to the normal on-road operating mode.

Then, the method 300 includes mobilizing the vehicle at 380, which can include driving the vehicle from the contained environment or service bay back onto the road.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. A method for diagnosing and conditioning a system of a vehicle, comprising:
    immobilizing the vehicle in a controlled environment;
    removing a production engine calibration program from an electronic control unit of the internal combustion engine system;
    uploading a diagnostic engine calibration program to the electronic control unit;
    running the diagnostic engine calibration program while the vehicle is immobilized in the controlled environment without user intervention, the diagnostic engine calibration including a plurality of diagnostic processes for operating an immobilized vehicle, wherein the plurality of diagnostic processes includes a high NOx sensor rationality test that includes disabling a DEF dosing event, providing an amount of engine out NOx at or above a predefined high NOx concentration threshold, operating an engine at or above a high speed threshold, determining a NOx concentration across a SCR system, and comparing the determined NOx concentration against a predetermined fault threshold to diagnose a NOx sensor;
    removing the diagnostic engine calibration program from the electronic control unit after completion of the plurality of diagnostic processes; and
    uploading the production engine calibration program to the electronic control unit;
    wherein one or more of the plurality of diagnostic processes cause the internal combustion engine system to operate outside of one or more calibration parameters.

2. The method of claim 1, further comprising controlling the order and timing of each diagnostic process in the plurality of diagnostic processes.

3. The method of claim 1, wherein the diagnostic processes include a SCR performance test before an SCR regeneration event, wherein the SCR performance test before an SCR regeneration event includes substantially maximizing an exhaust gas flow rate, and monitoring a NOx conversion efficiency at various DEF dosing rates.

4. The method of claim 1, wherein the diagnostic processes include a SCR performance test with an SCR regeneration event, wherein the SCR performance test with an SCR regeneration event includes elevating an exhaust gas temperature and reducing an engine speed for a predetermined amount of time followed by substantially maximizing an exhaust gas flow rate, and monitoring a NOx conversion efficiency at various DEF dosing rates.

5. The method of claim 1, wherein the plurality of diagnostic processes includes a low NOx sensor rationality test, wherein the low NOx sensor rationality test includes disabling a DEF dosing event, providing about 75 ppm to 100 ppm NOx out of the engine, and determining a NOx concentration across the SCR system, wherein the determined NOx concentration is compared against a predetermined fault threshold.

6. The method of claim 1, wherein the plurality of diagnostic processes includes a DOC and DPF temperature sensor rationality test, wherein the DOC and DPF temperature sensor rationality test includes comparing DOC and DPF temperature sensor readings to each other after an engine has run at an idle speed for a predetermined amount of time after running the engine at a relatively higher speed for another predetermined amount of time.

7. The method of claim 1, wherein the plurality of diagnostic processes includes a SCR temperature sensor rationality test, wherein the SCR temperature sensor rationality test includes comparing SCR temperature sensor readings to each other after an engine has run at an idle speed for a predetermined amount of time after running the engine at a relatively higher speed for another predetermined amount of time.

* * * * *